July 27, 1948.  E. T. MONTGOMERY  2,445,963
FLEXIBLE JOINT CONSTRUCTION FOR CERAMIC PIPES
Filed July 10, 1945
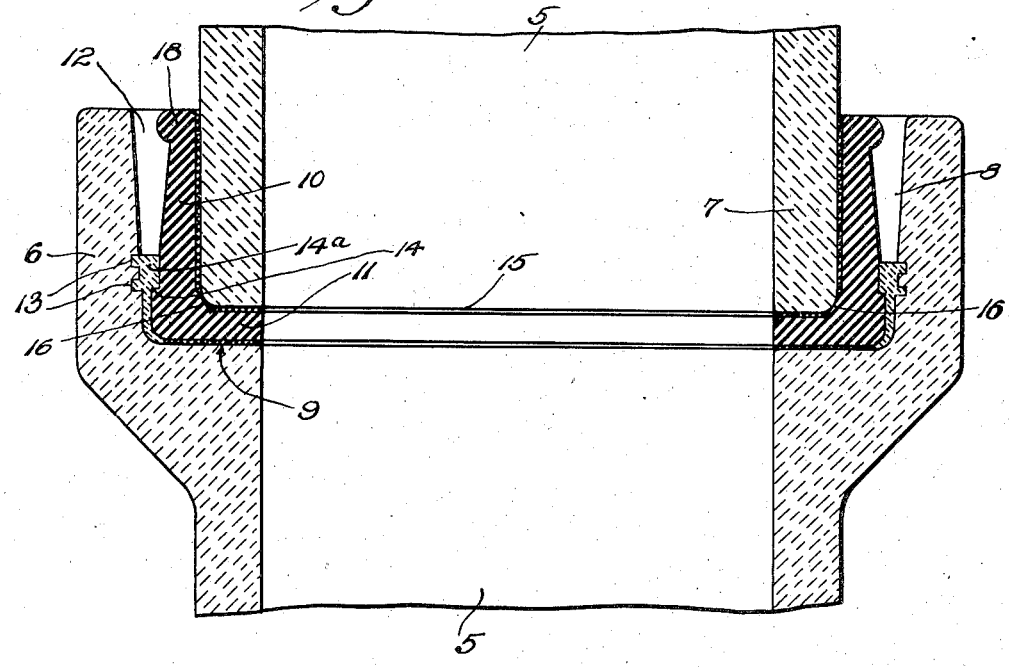
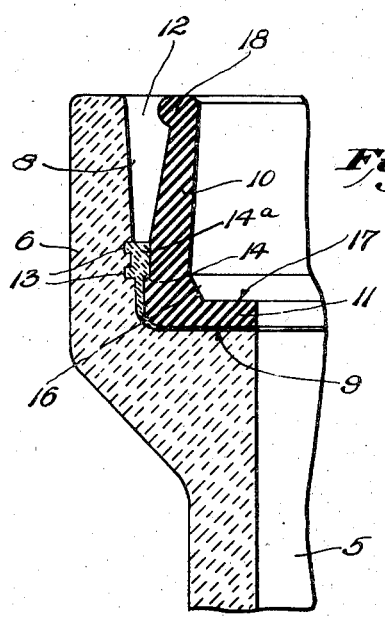
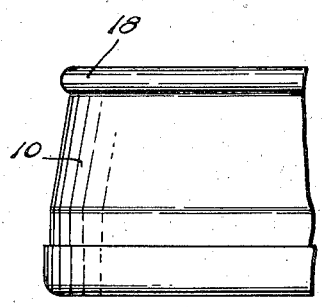
Inventor
Earle T. Montgomery
By *[signature]*
Attorney Patented July 27, 1948

2,445,963

UNITED STATES PATENT OFFICE 2,445,963

FLEXIBLE JOINT CONSTRUCTION FOR CERAMIC PIPE

Earle T. Montgomery, Columbus, Ohio, assignor, by mesne assignments, to The National Clay Pipe Research Corporation, Logan, Ohio, a corporation of Ohio Application July 10, 1945, Serial No. 604,239

6 Claims. (Cl. 285—115)

This invention relates to pipe joints and, more particularly, to pipe joints employed in uniting ceramic pipe members having interfitting bell and spigot ends.

In the manufacture of fired clay pipe, it is difficult to maintain close dimensional standards and uniform physical characteristics. During manufacture, such pipe will often warp or deflect longitudinally, or in transverse cross section will not be truly round or of precise diameters. These practical factors, among others, make it difficult to seal their bell and spigot ends against undesired fluid passage either from outside or inside the pipe. When warped pipe sections are encountered in the laying of such pipe, the same are deflected from true coaxial registration with adjoining pipe sections, rendering it difficult to align the pipe and properly seal their joints. Usually, it is customary to employ rigid unions between the meeting ends of such ceramic pipe, and which unions do not admit of relative movement or adjustment between the joined pipe members. As a result, the pipe, after various periods of use, develop joint disorders which require replacement or costly repairs.

Therefore, it is an object of the present invention to provide an improved joint construction for ceramic pipe of the bell and spigot type wherein the joint construction is formed to provide adequate flexibility in admitting of relative movement between the joined pipe members, as well as compensating for out-of-round condition and diameter variations within the limits of accepted manufacturing tolerances.

It is another object of the invention to provide such a joint in which flexibility is provided through the use of an annular sealing gasket or ring composed of a rubber or rubber-like composition, the same being adapted for fixed mounting within and upon the annular seat or shoulder formed in the bell end of one of the pipe members of a joint and in spaced relation from the inner wall surface of the bell, whereby when the spigot end of the complemental pipe member is inserted in the sealing ring, which elastically grips the spigot around its outer wall surfaces, certain axial deviation of the associated pipe members is permitted which compensates for defects or structural variations in the pipe members and at the same time maintains the fluidtightness of the joint.

A further object is to provide a pipe joint of this character in which the resilient sealing ring is adhesively united with the adjoining surfaces of the bell and spigot ends of the associated pipe members for the purpose of sealing the joint against fluid passage and holding the elements thereof in their properly assembled order by resisting relative longitudinal separation on the part thereof.

Still a further object is to provide a joint for clay pipe which may be substantially fully fabricated by the pipe manufacturer, and wherein but a minimum of effort is required on the part of the assembler or contractor in properly uniting the pipe members at the time the latter are being laid or joined.

Another object is to provide a joint for ceramic pipe which is characterized by the tightness and ability thereof to prevent fluid seepage, one through which plant roots will not penetrate and, also, a joint characterized by structural simplicity, ease and low cost of manufacture and long operating life.

For a further understanding of the invention, and additional objects and advantages thereof, reference is to be had to the following description and the accompanying drawing, wherein:

Fig. 1 is a horizontal sectional view taken through a pair of adjoining ceramic pipe members of the bell and spigot type and disclosing the improved joint construction forming the present invention;

Fig. 2 is a detail fragmentary horizontal sectional view disclosing the bell end of one of the pipe members with the sealing ring or gasket positioned therein;

Fig. 3 is a fragmentary edge elevational view of the gasket or sealing ring.

Referring more particularly to the drawings, the numeral 5 designates a pair of aligned ceramic pipe members. These pipe members are of duplicative construction, the same being formed at one end with a bell 6 and at their other end with a spigot 7. The enlarged bell end of one of said members provides a receiving socket 8 for the spigot end 7 of the next adjacent and complementary pipe member, the socket 8 terminating inwardly in an annular seat or shoulder 9.

In accordance with the present invention, there is positioned on and adhesively secured to the seat or shoulder 9 an annular sealing ring or gasket 10, the latter being preferably formed from rubber, and rubber-like composition or other similar elastic and resilient material. The ring or gasket at its inner end is formed with an inwardly directed circular flange 11 having a flat outer surface which is adhesively joined with the corresponding surface of the seat or shoulder 9. The adhesive employed may be a rubber base cement containing a volatile solvent which upon evaporation causes the cement to set and harden, effecting a highly tenacious union between the bell end of the pipe and the sealing ring or gasket. However, any other suitable cement or cements of the types recommended by fabricators of gaskets may be used.

Exteriorly, the ring or gasket possesses a slightly smaller diameter than the inside diameter of the bell socket, and to further seal and unite the ring or gasket with the bell end of the pipe, there is introduced into the inner portions of the annular space 12, formed between the ring or gasket and the inner walls of the bell socket, a sulphur-silica compound in a heated state. This compound flows into annular grooves 13 formed in the inner surfaces of the bell and also over and around an annular shoulder 14, formed exteriorly on the ring or gasket. When the sulphur-silica compound cools and hardens, the same produces a retaining band or body 14a for holding the sealing ring or gasket in position in the bell end of the pipe, as well as sealing the inner end of the annular space 12 against fluid seepage or passage. These operations of securing the ring or gasket in its operative position within the bell end of each pipe are performed at the time of manufacture of the pipe so that high manufacturing standards can be maintained and the necessary operations in assembling the joint in the field kept at a minimum.

In field assembly, the outer surfaces of the spigot end 7 of the complemental pipe member are also coated with the above-identified cement or its equivalent, as well as the inner surfaces of the ring or gasket 10 so that it is merely necessary to slightly expand the outer or open end of the ring or gasket to insert the spigot end of the pipe member therein, the spigot being advanced inwardly and longitudinally until the inner end 15 thereof contacts with a tapered seat 16, formed at the inner end of the ring or gasket, or with the outer seating surface 17 of the ring flange 11.

The seat 16 possesses preferably a 60 degree taper, which is desirable to center all variations in spigot diameter between, for example, a minimum of 4⅞ inches and a maximum of 5⅛ inches, and to support the weight of the spigot end of a pipe member when the pipe is laid in a horizontal position in a trench until the adhesive cement has set. It is believed that when a maximum size spigot is forced into the ring and is seated on the tapered seat, sufficient cement will be pushed ahead of it to fill any gap, thereby sealing the spigot end to the gasket or ring flange disposed on the bell shoulder.

The outer circumferential edge of the ring or gasket is provided with a reenforcing bead 18, which is spaced from the outwardly tapered inner circumferential wall of the bell. Thus, there is a region of flexibility afforded the ring or gasket by the space provided between the sulphur-silica band or body 14a and the outer end of the bell 6, providing for flexibility in the longitudinal alignment of the adjoining pipe ends.

Consideration will disclose that a joint formed in accordance with the present invention can be deflected for alignment of warped pipe an amount in degrees substantially equal to the dimensions of the V-shaped annular space 12 simply by distortion of the rubber gasket or sealing ring at the time spigot end of the next length of pipe is cemented into the bell of the complemental pipe. Further, through the use of the electric gasket or sealing ring, the joint is not only fully adaptable to all permissible variations of spigot diameter, but also of bell diameter. I find that it is preferable to use an adhesive cement in as thin a layer as possible in order to obtain quick setting thereof as well as maximum adhesion and strength, and the construction is such as to permit a tight, close fit of the ring or gasket to both the bell and spigot so that only a thin application of cement is needed.

The joint also affords control of its construction by the pipe manufacturer. The sealing gasket or ring is cemented into the bell end of a pipe at the manufacturing plant. In assembling the joint, all the contractor has to do is to brush cement on the inside of the gasket or ring and on the outside of the spigot end of the complemental pipe and push the two together longitudinally. The gasket or ring is designed so that it will be stretched a little to go over the spigot ends of all pipes. This compresses the adhesive cement and holds the surfaces together until the thin layer of cement sets. When cementing the gasket or ring into the bell end of a pipe in the manufacturing plant, a suitable weight should be used inside the gasket to hold it tightly to the bell shoulder until the cement has attained its initial set.

While it may appear from the drawing that the bell socket could be shortened in length or depth, it is believed to be better practice to employ a depth of the type illustrated for the reason that the bell limits the movement of the completed joint and supports it. If the design permitted more movement, the gasket or sealing ring might be pulled loose from the bell shoulder under possible conditions of settling of the trench bottom.

In summarizing the advantages of my improved joint construction, it will be noted that the same is strong mechanically and highly resistant to end pull; it will not leak at the internal pressure which the pipe is designed to receive; underground the joint possesses a long life and is not subject to any type of deterioration producing leakage; it is also root proof, since plant roots will not grow through a tight and dry joint; again it provides for alignment of warped pipe while the pipe is being laid; the joint is flexible to relieve beam stresses from superimposed trench loads; it is adaptable to all variations in diameter and out-of-round conditions of commercial pipe within the maximum and minimum tolerances of accepted specifications; the joint is relatively inexpensive to manufacture, fool-proof and simply and easily made up by the contractor and, furthermore, it can be, as nearly as possible, fabricated in the pipe manufacturer's plant.

While I have disclosed what I consider to be a single preferred embodiment of my improved pipe joint, nevertheless, it will be understood that the same is subject to certain modification or variation without departing necessarily from the scope of the following claims.

I claim:

1. Joint construction for ceramic pipe members of the bell and spigot type, comprising a sealing ring of flexible elastic composition having an annular body terminated at one end in a flat-surfaced inwardly directed sealing flange, the latter being positioned upon and adhesively secured to the shoulder of the bell end of one of said pipe members for permanent retention therewith, the inner diameter of the body of said ring being such as to cause it to receive snugly and elastically surround the outer wall surfaces of the spigot end of the complemental pipe member for adhesive union therewith, there being an annular space provided between the outer circumferential wall of said ring and the adjacent inner wall of the bell socket to provide for limited flexing of said ring in unison with the spigot member and without compression of the material comprising the ring in compensating for coaxial misalignment of the joined pipe members.

2. Pipe construction comprising a ceramic pipe member formed at one end with a bell enlargement having an internal socket which terminates inwardly in a seating shoulder, a sealing ring of elastic composition permanently seated upon and adhesively secured to said shoulder, the outer circumferential wall surfaces of said ring being mainly spaced from the adjacent inner wall surfaces of said socket, and the inner diameter of said ring being such as to cause it to receive snugly and elastically grip the outer wall surface of the spigot end of the complemental pipe member with the end face of the pipe spigot in sealing contact with the inner end of said ring, the spacing of the outer circumferential wall surfaces of said ring from the inner surfaces of the socketed pipe member being such as to provide for limited flexing movement of the outer and unseated portions of the ring in unison with the spigot member and without compaction of the elastic material from which the ring is formed.

3. In pipe construction, a ceramic pipe member having a bell socket at one end thereof formed with an internal seating shoulder, a sealing ring of flexible elastic composition having an annular body terminated at its inner end in a flat-surfaced inwardly directed seating flange, the latter being positioned upon and adhesively secured to the shoulder of the bell socket of said pipe member for permanent retention therewith, the inner diameter of the body of said ring being such as to cause it to receive snugly and elastically surround the outer wall surfaces of the spigot end of a complemental pipe member for adhesive union therewith, there being an annular space provided between the outer circumferential walls of said ring and the adjacent inner walls of the bell socket to provide for limited flexing of said ring without compression thereof in compensating for coaxial misalignment of the joined pipe members, and a cast band of sulphur-silica composition disposed in the inner end of the bell socket, said band serving to seal the joint formed between said ring and the bell socket and retain said ring in operative connection with the walls of the bell socket.

4. Pipe construction as defined in claim 3 and wherein the walls of the bell socket are formed with annular anchoring grooves for the reception of the sulphur-silica band.

5. Pipe construction as defined in claim 3, and wherein the outer circumferential wall of the sealing ring is annularly shouldered for engagement with a corresponding shoulder provided on the sulphur-silica band.

6. In pipe construction, a ceramic pipe member having a bell socket at one end thereof which terminates inwardly in an annular seating shoulder, and a flexible elastic ring positioned in said socket and permanently secured at its inner end to the shoulder of said socket, said ring having its outer wall spaced from the adjacent inner walls of said socket, the inner walls of said socket being inwardly tapered, the inner diameter of said ring being such as to enable the same to receive and elastically grip the outer walls of the spigot end of a complemental pipe member, the space between said band and the inner walls of said socket providing for axial deflection of the complemental pipe member without compression of the ring to compensate for misalignment between said pipe members resulting from structural imperfections therein.

EARLE T. MONTGOMERY.

REFERENCES CITED

The following references are of record in the file of this patent:

UNITED STATES PATENTS

| Number | Name | Date |
|---|---|---|
| 1,985,325 | Nathan | Dec. 25, 1934 |
| 2,090,266 | Parker | Aug. 17, 1937 |
| 2,219,289 | Bennett | Oct. 29, 1940 |
| 2,401,554 | Davids | June 4, 1946 |